March 2, 1971     W. S. WICKERSHAM, JR     3,567,536

CONTAINER AND METHOD OF PREPARATION

Filed Feb. 7, 1968

- OUTER COAT-11
- FABRIC-10
- SEALANT-9
- FABRIC-8
- BARRIER-7
- INNER LINER-6
- COB-WEBBED VITHANE-5
- FOAM-4

INVENTOR.
WILLIAM S. WICKERSHAM, JR.

BY

ATTORNEY

3,567,536
Patented Mar. 2, 1971

3,567,536
CONTAINER AND METHOD OF PREPARATION
William S. Wickersham, Jr., North Canton, Ohio, assignor to The Goodyear Tire & Rubber Company, Akron, Ohio
Filed Feb. 7, 1968, Ser. No. 703,677
Int. Cl. B32b 5/18
U.S. Cl. 156—78
4 Claims

ABSTRACT OF THE DISCLOSURE

This invention relates to a container and the method of making said container comprising forming a foraminous mass or a reticulated foam having the shape of the desired container, sealing the surface opening of the foraminous mass and applying a coating of the container material over the sealed layer on the foraminous mass to form the sides of the container. Preferably, the foraminous mass is a reticulated polyurethane foam and the sealing material is a polyurethane reaction mixture which when sprayed forms a cobwebbing and the coating material is an elastomeric material.

---

This invention relates to a container and the method of making said container. More particularly, this invention relates to a method of making a container wherein a foraminous mass having the shape of the container is used as the building form.

Heretofore in making an elastomeric fabric containing containers it has been the general practice to use collapsible or rigid forms which have to be removed from the finished container.

An object of this invention is to provide an improved container having internal reinforcement and also a method of making said container wherein the building form becomes an integral part of said container.

Figure 1:
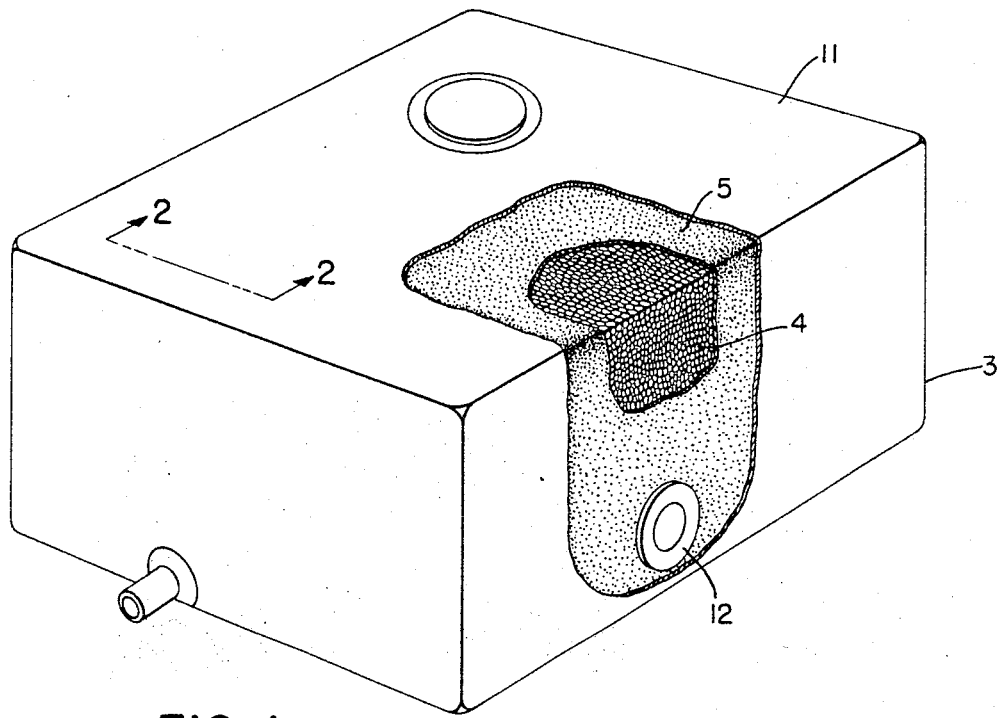
Figure 2:
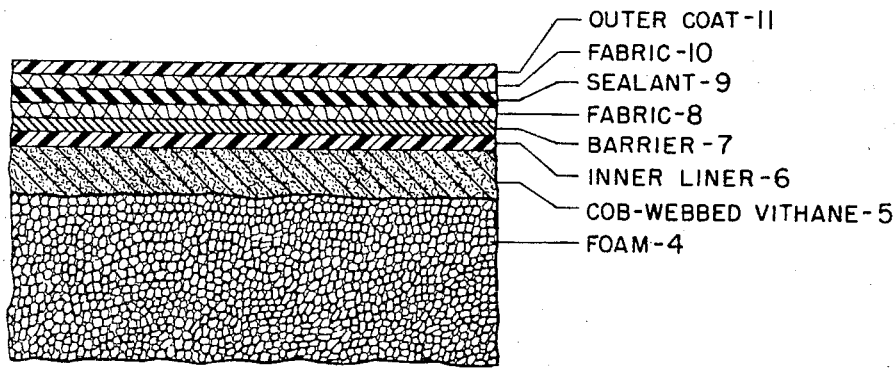

Further objects and advantages of this invention may be more readily understood by reference to the drawings wherein FIG. 1 is a perspective view of a finished container having part thereof cut away and FIG. 2 is a cross sectional view through the container along the line 2—2 of FIG. 1.

In the practice of the present invention a foraminous mass is formed having the shape of the desired container and then this foraminous mass is covered with a seal coat to seal the surface openings of the foraminous mass and then a suitable coating of the coating material is applied over the foraminous mass to build up a container having the desired wall thickness. If desired, suitable fittings including access fittings may be placed on the foraminous mass and be built into the container as an integral part thereof.

Referring to FIG. 1, numeral 3 represents the container in general which is illustrated as having a rectangular shape although it may have any other shape. Numeral 4 refers to the foraminous material which in a preferred embodiment is formed in the shape of the container by pouring a suitable foamable material into a mold having the desired shape and foaming it to form a cured foam material having the shape of the desired container. In the event the foamable material is a polyurethane foamable reaction material it is sometimes desirable after the foamable mixture has foamed and reacted to give a cured foam to reticulate the foam by subjecting it to a treatment such as those described in U.S. Patent 3,171,820.

Thus, with the foraminous mass formed into the shape of the container, it is treated with a reaction mixture which has been applied to the surface of the foraminous mass in a thick cobwebby state wherein the cobweb mass adheres to the foraminous mass and blocks the openings thereof in the surface area without blocking the openings away from the surface of the mass. Then it is preferred to apply a suitable skinning material over the cobwebbed or sealed coat 5.

The skin coat may be varied according to the service to which the container is to be subjected. In those cases where the container is to be a fuel cell, for instance, for an airplane, it may be desirable to have an inner liner 6 followed by a barrier layer 7 and a fabric strength member 8, then a sealant layer 9 where the fuel tank is to be of the bullet seal type and then the sealant layer 9 is followed with an additional fabric coat 10 and then an outer coat 11. It should be appreciated that these layers may be varied to give the container the desired service characteristics.

It should be evident that where the container is to be used as a fuel cell for an airplane the inner layer 6 may be a spray coat of polyurethane material or a conventional elastomeric material such as a suitably compounded synthetic or natural rubber for instance, a butadiene acrylonitrile rubber. Likewise the barrier coat may be polyamide of the nylon type or a polyvinylidene chloride material or other barrier materials depending on the nature of the fuel component or liquid with which the container will be filled. Normally the fabric coat will be a net or woven fabric where the fabric may be made of any of the fabric materials, such as a cellulosic-material, polyester, polyamide or even glass or metal fibers.

The sealant coat 9 will preferably be those that are normally used in making bullet-proof self-sealing fuel tanks. For instance, a natural rubber compounded with a small amount of curative sufficient to give a product that is highly swellable but that does not dissolve or disintegrate in contact with the fuel. Usually a layer of natural rubber is followed with a fabric, such as a tire cord fabric, containing a calender coat of compounded natural rubber and these successive layers may follow each other until a sealant layer of about 20 to 80 mils in thickness is obtained with the thickness of the sealant layer being a function of the type projectile, for instance, .30 caliber or .50 caliber bullets to be protected against.

The following example further illustrates this invention. The parts and percentages are by weight unless otherwise indicated.

EXAMPLE I

Into a suitable reactor was placed 100 parts of a polyester prepared by the condensation of 1,4 butane diol with adipic acid. This polyester had a hydroxyl number of approximately 100, an acid number of approximately 0.5, and a molecular weight of approximately 1000. The polyester was heated to 90° C. to liquefy the polyester. The liquefied polyester was stirred for one hour at 90° C. at a reduced pressure of about 5 to 10 millimeters of mercury absolute. The pressure was then adjusted to atmospheric pressure. To 5.43 parts of 1,4 butane diol, from which water had been removed by distilling 10 percent by weight of the diol, was added 0.95 part of 4,4'-diamine diphenyl sulfone. The 4,4'-diamino diphenyl sulfone was dissolved in the 1,4-butanediol at about 50° C. and the resulting solution added to the liquefied polyester. The mixture was stirred for 5 minutes until the temperature of the mixture was allowed to reach 80° C. At this time, 39.7 parts of 4,4'-diphenyl methane diisocyanate was added to the stirred mixture. The mixture was stirred for an additional 2 minutes and quickly poured into a can, and the can covered to maintain an inert atmosphere. The can had previously been pre-dried by heating to 110° C. The mixture in the can was cured by placing it in a hot air oven at 140° C. for 3½ hours.

The cured material (100 parts) was broken into small particles and added to 20 parts of tetrahydrofuran at about 70° C. All of the particles dissolved in the tetrahydrofuran, the resultant viscous solution then was used to apply the cobwebbing to the foam.

A foam having the shape of a fuel cell such as that shown in FIG. 1 was formed by pouring a polyurethane foamable reaction mixture into the mold and allowing it to foam and cure. The polyurethane foamable reaction mixture may be any of those that give a flexible to rigid foam, preferably substantially open celled, although a closed cell foam may be crushed to produce an open cell foam. Usually the foamable reaction mixture comprises a mixture of an organic polyisocyanate (more than 1 mol), a reactive hydrogen containing material (1 mol) such as the polyester polyols, a blowing agent such as water and a low boiling liquid such as the fluorohydrocarbons and catalysts.

The foam was treated to reticulate it by placing it in a suitable retaining mold and filling the cavities thereof with the proper mixture of oxygen and natural gas and the sparking to cause the mixture of oxygen and natural gas to ignite or explode. This reticulated foam was then used as the building mold to construct a fuel container.

First a cobwebby coating was applied over the outer surface of the reticulated foam by applying the 20 percent tetrahydrofuran solution of the soluble polyurethane to the coating from a DeVilbis spray gun having a No. 30 tip, at a pressure of 50 to 60 p.s.i. to lay the polyurethane down as essentially a string. The cobwebbing was laid down as needles which after a few seconds flows from the jackstraw formation to effectually block and seal the pores of the reticulated foam. Then over this cobwebbing or spread-out jackstraw structure there was applied a spray coat of a liquid polyurethane such as that described in Example 2 of the patent application of Nourot et al., Ser. No. 591,647 filed Nov. 2, 1966. Then a barrier coat of an alcohol soluble nylon was applied over the polyurethane coating. An additional coat of polyurethane was applied over the barrier coat and this was followed with a nylon fabric and the nylon fabric was covered with a coating of polyurethane. The resulting structure was allowed to cure at room temperature (about 75° F.) to give a fuel cell suitable for use in airplanes or automobiles wherein the reticulated foam forming the building form became an integral part of the fuel cell.

EXAMPLE II

A fuel cell was built according to the method illustrated in FIG. 1 and Example I except before the application of the final fabric coat and the outer polyurethane coating a sealant layer was added. The sealant layer was applied by spreading and adhering a sheet of natural rubber compounded with 1 to 3 parts of sulfur and 5 parts of magnesium oxide together with a small amount of mercaptobenzothiazole per hundred parts of natural rubber. This natural rubber sheet was adhered to the previous polyurethane coat with a coat of a tie gum comprising polychloroprene and an organic polyisocyanate such as methylene di (phenyl isocyanate). Over this natural rubber sheet was applied a calendered sheet of tire fabric which had been coated in the calender with natural rubber compounded in accordance with the above recipe for the rubber sheet. To get proper adhesion between the calendered fabric and the natural rubber sheet, the natural rubber sheet was wet with an aliphatic solvent containing some aromatic solvent. This coating with this solvent mixture rendered the natural rubber sufficiently adhesive to adhere the sheet and fabric together. If desired, the natural rubber sheet and calendered fabric may be built up in successive layers to give the desired thickness, preferably about 30 to 80 mils depending on the type projectile to which protection is desired and the service to which the fuel cell will be exposed. Also, if desired, in some service a sheet of polyurethane foam may be applied to follow the sealant layer to give added protection and resistance to the loss of fuel when the tank has been hit by rifle or automatic weapon fire and the projectile is of the explosive and incendiary type. Where a polyurethane foam layer is on the outside of the sealant layer, it is preferred that the foam be of the closed cell type which has been crushed as this foam would reduce the tendency of the fuel to leak from the cell and ignite.

In another embodiment of this invention it is particularly beneficial to make containers which have access fittings of the type shown by numeral 12 already built into the container. According to this embodiment the access fitting is made from a suitable polymeric material, for instance, a cast polyurethane, and is adhered to the reticulated foam with a suitable polyurethane adhesive such as a reaction mixture of a polyester polyol or polyether polyol with toluene diisocyanate and sufficient diamines of the slow type to essentially neutralize the free isocyanate. With the polyurethane access fitting or a suitable metal fitting placed on the reticulated foam and cemented thereto it is possible then to seal the reticulated foam with the cobweb seal coating. With the seal coat in place, additional coats of material may be applied to build the container into the desired thickness and for the desired utility according to the teachings of Example I or II. A particular beneficial effect of this method of constructing a container is that it gives a container having access fittings which are internally joined to the reticulated foam and this reduces the strain on the sides of the container and the tendency of the access fitting to tear out of the sides of the container.

Other foams and polyurethanes can be used, for instance, the polyhydrocarbon foams such as polystyrene, polybutadiene, polyisoprene, polyethylene, polypropylene and their copolymers and blends thereof. Also any of the other foamable materials such as polyvinyl chloride, polyethers or polyesters can be used where the liquid to be held by the container does not unduly effect the foam.

While certain representative embodiments and details have been shown for the purpose of illustrating the invention, it will be apparent to those skilled in this art that various changes and modifications may be made therein without departing from the spirit or scope of the invention.

What is claimed is:
1. A method of making a container comprising molding a foamable material while foaming to form a container, sealing the surface openings of the foamed container by applying a material in cobweb form to the container, and coating the sealed container with an elastomeric material.
2. The method of claim 1 wherein a barrier layer is applied to each face of the container, said barrier layer selected from the group consisting of polyamide and polyvinylidene chloride.
3. The method of claim 2 wherein the container faces are applied with a bullet or puncture sealant layer.
4. The method of claim 1 wherein a fuel sealant layer of cloth and elastomer swellable in fuel is applied prior to application of the outisde coat of elastomeric material.

References Cited
UNITED STATES PATENTS

| | | | |
|---|---|---|---|
| 3,193,441 | 7/1965 | Schafer | 156—242X |
| 3,197,352 | 7/1965 | Coates | 156—242 |
| 3,269,887 | 8/1966 | Windecker | 156—242X |
| 3,284,260 | 11/1966 | Best | 156—242X |
| 3,328,231 | 6/1967 | Sergovic | 156—242X |

BENJAMIN R. PADGETT, Primary Examiner

S. J. LECHERT, Jr., Assistant Examiner

U.S. Cl. X.R.

156—242, 166, 306, 309; 161—159, 160; 264—18; 220—83, 88